Patented Dec. 30, 1969

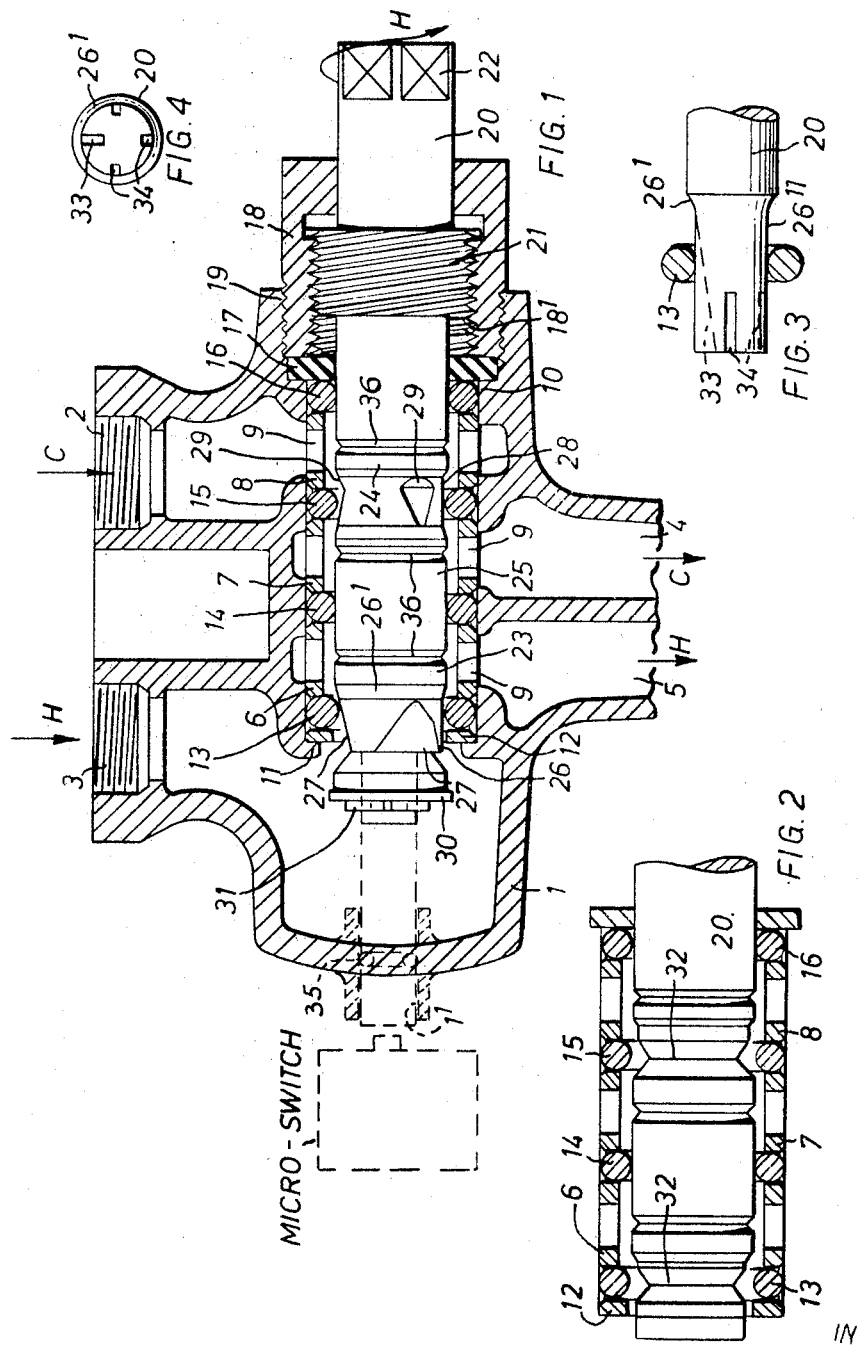

3,487,435
CONTROL VALVES FOR FLUIDS
John Maxwell Sheardown, 6 Harefield,
Harlow, Essex, England
Filed Apr. 8, 1968, Ser. No. 719,473
Claims priority, application Great Britain, Apr. 14, 1967, 17,212/67
Int. Cl. F16k 11/07, 19/00
U.S. Cl. 137—454.6                                    7 Claims

ABSTRACT OF THE DISCLOSURE

This invention relates to a valve for simultaneously controlling the flow of at least two separate supplies of fluid so as if desired to obtain a separate discharge of said supplies in variable proportions. The invention is particularly applicable to water taps for washing or cleansing installations both industrial and domestic, including wash basins, baths, sinks, showers and the like.

BACKGROUND OF THE INVENTION

Valves are known for the control of two or more separate supplies of fluids in which the valving surfaces comprise metal-to-metal contact. The invention has for an object to provide a control valve of generally improved and simplified construction which results in more efficient operation and longer working life than heretofore obtained. The invention provides particularly a construction in which leakages are practically eliminated and metal-to-metal contact for the valving surfaces is avoided. This has the distinct advantage that loss of efficiency of the valve as a result of damage to such surfaces by corrosion or incrustation is avoided, whereby the life of the valve is considerably increased. It also has the advantage that the necessity for accurate machining of opposing valving surfaces can be dispensed with, thus reducing considerably production costs. The improved construction also results in the obtaining of greater accuracy of control of the fluids to be discharged in variable proportions.

SUMMARY OF THE INVENTION

Accordingly, the present invention consists in a valve for simultaneously controlling the flow of at least two separate supplies of fluid, comprising a valve body having an inlet port for each of said separate supplies of fluid and an outlet for each of said separate supplies of fluid, a valve plunger movable longitudinally within a bore in the valve body, closure means for each inlet port, each said closure means consisting of a peripheral valving surface and a resilient member disposed concentrically to the peripheral valving surface, said valving surfaces being spaced apart in the longitudinal direction of the valve plunger, and a further resilient member cooperating with a peripheral cylindrical surface and disposed so as to maintain said supplies of fluid separate from one another in the valve body.

By virtue of this arrangement for example a longitudinal movement of the valve plunger from a first of two end positions thereof in which all said closure means are closed to interrupt the flow of the fluids through all said inlet ports to a second of said end positions wherein only one of said inlet ports is open and the other inlet port is fully closed, results first in opening of said other inlet port then in gradual opening of said one inlet port, and thereafter in gradual closing of said other inlet port so as to vary the proportions of fluids through the respective outlets in dependence upon the position of said plunger until said other end position thereof is reached.

The construction of the control valve according to the present invention is particularly advantageous, as far as safety to the user is concerned, when the valve is used, for example in a hot and cold water supply system, as it is possible to operate the valve in such manner as, starting from a closed position, to provide full delivery of cold water before delivery of hot water begins, thereby avoiding any risk of accidental scalding upon initial operation of the valve. However, it is also possible to provide full delivery of hot water when the cold water is completely shut off, the separate supplies between these two positions being controllable in variable proportions, for example to give a mixture at a desired temperature at the point of discharge to the atmosphere.

The peripheral valving surfaces are preferably provided on the valve plunger, each said peripheral valving surface cooperating with a respective sealing ring supported in the valve body. A similar arrangement may be used for the means serving to maintain the supplies of fluid separate from one another in the valve body.

Alternatively, the peripheral valving surfaces may be provided in the valve body and the cooperating sealing rings supported in appropriate peripheral grooves on the valve plunger.

In order that the invention may be more readily understood, reference is made to the accompanying drawings which illustrate diagrammatically and by way of example several embodiments thereof, and in which:

FIGURE 1 shows a control valve in accordance with the invention in axial section;

FIGURE 2 is a modification of the valve plunger shown in FIGURE 1; and

FIGURE 3 and 4 respectively show an elevation and end view of a further modification of the valve plunger.

Referring to FIGURE 1 of the drawings, the control valve comprises a valve body 1 closed at one end (left-hand in the drawing) and open at the other end. The valve body 1 has an inlet port 2, for example for cold water supply C and an inlet port 3 for hot water supply H. A discharge outlet 4 for the cold water supply and a discharge outlet 5 for the hot water supply are provided in the valve body at diametrically opposed positions relative to the inlet ports 2 and 3. Three sleeve members 6, 7 and 8 provided with radial apertures 9 are co-axially mounted in a bore 10 of the valve body 1, the axis of the bore 10 extending at right angles to the axes of the inlet ports and discharge outlets in the valve body 1. The inner end of the bore 10 terminates in an inwardly flanged portion 11 of the valve body 1 and forms an abutment for a washer 12, between which and the adjacent apertured sleeve member 6 a sealing member 13 is axially braced. Further sealing members 14, 15 and 16 are respectively provided between the sleeve members 6 and 7, 7 and 8 and between the latter and a washer 17 cooperating with a gland nut 18 which is screwed into an enlarged screw threaded diameter portion 19 of the bore 10 and which closes the bore 10 towards the atmosphere. The sealing members 13, 14, 15 and 16 are in the form of resilient O rings.

Located within the bore 10 of the valve body 1 is a valve plunger 20, one end of which extends outwardly through the gland nut 18. The gland nut 18 is provided internally with a screw thread 18' engageable by a screw-threaded collar 21 of the plunger 20 so that upon rotation of the plunger 20 the latter moves longitudinally of the bore 10. The outer end of the valve plunger 20 has a squared end 22 to which a knob or the like operating member is conventionally secured. The knob is preferably provided with markings to indicate the angular position of the valve plunger 20 corresponding to a desired liquid delivery.

The portion of the length of the valve plunger 20 extending into the bore 10 is formed to provide two peripheral valving surfaces 23 and 24 adapted respectively to cooperate with the O-rings 13 and 15, to close or open the inlet port 3 or 2 in dependence on the axial position of the valve plunger 20 in the bore 10. The valving surfaces 23 and 24 are separated from one another by a continuous cylindrical portion 25 of the valve plunger 20, the portion 25 cooperating continuously with the O-ring 14 to maintain the flow of the hot and cold water supplies separate from one another through the control valve.

The peripheral valving surface 23 is provided with a reduced diameter portion 26 between which and the surface 23 a comparatively short taper or chamfer 26' is formed to provide a gradual transition from the smaller diameter to the larger one so as to obviate damage and wear of the O-ring 13 which is made of comparatively soft material, such as rubber. The reduced diameter portion 26 of the valving surface 23 is formed with a plurality (in the present example, three) of flats 27 arranged in spaced relationship around the periphery of portion 26 and forming in cooperation with the O-ring 13 a plurality of passages for the liquid, that is the hot water supply. The flats 27 are inclined at an angle to the axis of the valve plunger 20 so that they taper in the direction away from the inner end of the valve plunger 20.

A further reduced diameter portion 28 is provided in the peripheral valving surface 24, in which are provided a plurality of notches 29 arranged in spaced relationship around the periphery of portion 28 and forming in cooperation with the O-ring 15 a plurality of passages for the liquid, that is the cold water supply. The shape of the notches 29 is asymmetrical in order to facilitate easy machining and allow a greater degree of control over liquid proportions than heretofore. However, other shapes for the notches may be employed.

In place of the notches 29 and the flats 27, a V-shaped continuous peripheral groove 32 (FIGURE 2) of suitable depth may be provided. If notches 29 are used the depth thereof is so selected as to give substantially the same or different total passage area as is provided by the continuous V-shaped peripheral groove 32. In the former case, individually each passage is of greater depth than the passage provided by the continuous groove. In an alternative construction, the flats 27 on the reduced diameter portion 26 may be substituted by notches similar to those of the portion 28, or the portion 26 may be provided with a continuous taper in continuation of the chamfer 26'.

Further, in a modified construction of the valve plunger 20, the latter is provided with a reduced diameter end portion 26" (FIGURES 3 and 4) in which is machined one rectangular, longitudinal groove 33 the depth of which tapers towards the open end of the valve body 1, and three circumferentially spaced uniform grooves 34 of smaller depth than that of the outer end of the groove 33. The grooves 34 extend to approximately half the length of the groove 33. This arrangement of longitudinal grooves enables the passage for the flow of fluid at the end 26" of the plunger 20 to be increased, even after the passage for the other flow of fluid is fully closed, by further movement of the plunger 20 in the direction of the open end of valve body 1.

The arrangement of the notches and flats respectively on the reduced diameter portions 28 and 26 provides a safeguard against damage being caused to the O-rings by the sharp edges of the "lands" separating individual notches or flats from one another. However, the notches and flats or the continuous groove may be provided on the full diameter of the valve plunger.

In order to facilitate easy dismantling of the control valve, an extraction washer 30 held in position by a securing ring 31 is provided at the inner end of the valve plunger 20. On withdrawal of the plunger 20 from the valve body 1, the washer 30 engages the washer 12 and thus enables the withdrawal of the assembly of the sealing rings 13, 14, 15 and 16 together with the apertured sleeves 6, 7 and 8 and the washer 17 in one operation. Since on withdrawal of the plunger 20 in the manner described above, the O rings become slightly compressed axially and may obstruct the smooth withdrawal of the assembly, peripheral grooves 36 are provided which are so disposed on the plunger 20 that on engagement of the washer 30 with the washer 12 these grooves register with, that is are positioned opposite the O rings 14, 15 and 16 respectively, so as to relieve the compression of the O rings.

Whilst in the preferred embodiment described above the outlets 5 and 6 for the separate supplies of fluid are arranged in the side of valve body 1 diametrically opposite to that having the inlet ports 3 and 2, in an alternative construction the fluid outlets may be provided on the same side of the valve body as the inlet port without the manner of operation of the valve being altered.

It is to be understood, that for reason of different applications, the valve can be used with reversed directions of flow of the fluid through the valve. In such arrangement outlets 4 and 5 become inlets and inlets 2 and 3 become discharge outlets, or one of the outlets 4 or 5 becomes inlets and correspondingly one of the inlets 2 or 3 become discharge outlets.

If it is required to utilise the movement of the valve plunger 20 for actuation of external devices, for example a microswitch controlling a pump or motor (not shown) required to operate in conjunction with the valve, the inner end of the plunger 20 may be extended provided with an extension 20' which projects through a bore 1' in the valve body 1 to form one contact member for the microswitch as indicated in ghost lines in FIGURE 1. An O-ring 35 is provided to seal the plunger extension 20' against the bore 1'.

I claim:

1. A valve for simultaneously controlling the flow of at least two separate supplies of fluid, comprising a valve body having an inlet port for each of said separate supplies of fluid and an outlet of each of said separate supplies of fluid, a valve plunger mounted for longitudinal movement within a bore in the valve body, closure means for each inlet port, each said closure means consisting of a peripheral surface including a reduced diameter portion on said plunger and an O-ring supported in the valve body by means of at least one radially apertured sleeve member disposed concentrically to the peripheral surface, said surfaces being spaced apart in the longitudinal direction of the valve plunger, and a further O-ring cooperating with a peripheral cylindrical surface of said plunger and disposed intermediate said first mentioned O-rings so as to maintain said supplies of fluid separate from one another in the valve body.

2. A valve as claimed in claim 1, having means supporting said valve plunger for longitudinal movement from a first of two end positions thereof in which all said closure means are closed to interrupt the flow of the fluids through all said inlet ports to a second of said end positions wherein only one of said inlet ports is open and the other inlet port is fully closed, and wherein said other inlet port is first opened, and then said one inlet port is gradually opened thereafter while gradually closing said other inlet port so as to vary the proportions of fluids through the respective outlets in dependence upon the position of said plunger until said other end position thereof is reached.

3. A valve as claimed in claim 1 wherein at least one of said reduced diameter portions includes a plurality of circumferentially spaced flat portions inclined at an angle to the axis of the valve plunger.

4. A valve as claimed in claim 1 wherein at least one of said reduced diameter portions includes a plurality of circumferentially spaced asymmetrically shaped notches.

5. A valve as claimed in claim 1 wherein at least one of said reduced diameter portions includes a continuous V-shaped groove.

6. A valve as claimed in claim 1 wherein at least one of said reduced diameter portions includes a tapering, rectangular cross-section, longitudinal groove and three uniform grooves of smaller depth and length than said tapering groove.

7. A valve as claimed in claim 1 wherein the inner end of the valve plunger is provided with an extraction washer for facilitating withdrawal of the assembly of the sealing rings and the apertured sleeve members in one operation.

References Cited

UNITED STATES PATENTS

| | | | |
|---|---|---|---|
| 2,707,374 | 5/1955 | Ericson | 137—625.18 XR |
| 2,747,611 | 5/1956 | Hewitt | 137—625.69 |
| 2,870,764 | 1/1959 | Carlson et al. | 137—625.18 XR |
| 2,940,465 | 6/1960 | Frantz | 137—454.5 XR |
| 2,988,100 | 6/1961 | Couffer | 200—61.86 XR |
| 3,109,442 | 11/1963 | Horowitz | 137—625.48 XR |
| 3,138,175 | 6/1964 | Chilcoat | 251—333 XR |
| 3,289,688 | 12/1966 | Mallott. | |
| 3,330,294 | 7/1967 | Manning et al. | 137—454.6 XR |

FOREIGN PATENTS

| | | |
|---|---|---|
| 1,312,239 | 11/1962 | France. |
| 855,541 | 12/1960 | Great Britain. |

HENRY T. KLINKSIEK, Primary Examiner

U.S. Cl. X.R.

137—625.18, 625.69; 251—205; 200—61.86, 81.9